(12) United States Patent
Lillemo et al.

(10) Patent No.: US 12,032,902 B2
(45) Date of Patent: Jul. 9, 2024

(54) TEXT GENERATION FOR PATENT APPLICATIONS USING NATURAL LANGUAGE MODELING AND PROGRAMMABLE TEMPLATING LANGUAGE

(71) Applicant: Patent Draftr, LLC, Lewes, DE (US)

(72) Inventors: Shawn Lillemo, Haymarket, VA (US); Andrii Balaban, Mykolaiv (UA); Dmytro Sabodashko, L'viv (UA)

(73) Assignee: Patent Draftr, LLC, Lewes, DE (US)

( * ) Notice: Subject to any disclaimer, the term of this patent is extended or adjusted under 35 U.S.C. 154(b) by 0 days.

(21) Appl. No.: 17/456,737

(22) Filed: Nov. 29, 2021

(65) Prior Publication Data

US 2022/0180051 A1    Jun. 9, 2022

Related U.S. Application Data

(60) Provisional application No. 63/199,073, filed on Dec. 4, 2020.

(51) Int. Cl.
| | | |
|---|---|---|
| *G06F 40/40* | (2020.01) |
| *G06F 16/2455* | (2019.01) |
| *G06F 40/186* | (2020.01) |
| *G06F 40/253* | (2020.01) |
| *G06F 40/279* | (2020.01) |
| *G06Q 50/18* | (2012.01) |

(52) U.S. Cl.
CPC ...... *G06F 40/186* (2020.01); *G06F 16/24565* (2019.01); *G06F 40/253* (2020.01); *G06F 40/279* (2020.01); *G06F 40/40* (2020.01); *G06Q 50/184* (2013.01)

(58) Field of Classification Search
None
See application file for complete search history.

(56) References Cited

U.S. PATENT DOCUMENTS

| | | | |
|---|---|---|---|
| 10,664,558 B2 | 5/2020 | Mahamood | |
| 2005/0278623 A1 | 12/2005 | Dehlinger et al. | |
| 2008/0320412 A1 * | 12/2008 | Wake | G06F 3/0486 715/781 |
| 2014/0282371 A1 | 9/2014 | Hirsch et al. | |
| 2016/0232246 A1 * | 8/2016 | Rau | G06F 16/3338 |
| 2018/0232361 A1 | 8/2018 | Schick et al. | |
| 2019/0057074 A1 * | 2/2019 | Carey | G06F 40/186 |
| 2020/0380061 A1 * | 12/2020 | Saar | G06F 40/166 |
| 2021/0035179 A1 * | 2/2021 | Mishra | G06F 3/0482 |
| 2022/0075929 A1 * | 3/2022 | Booth | G06F 40/289 |

* cited by examiner

*Primary Examiner* — Ariel Mercado
(74) *Attorney, Agent, or Firm* — Harrity & Harrity, LLP

(57) ABSTRACT

In some implementations, a device may identify a text from a document that includes structured information, wherein the structured information is a set of patent claims. The device may extract a first one or more parts and a second one or more parts, wherein the first one or more parts are one or more grammatical parts and the second one or more parts are one or more legal parts. The device may insert the first one or more parts and the second one or more parts into a structured model data object, wherein the structured model data object is a claim model data object. The device may generate structured output text from the structured model data object, wherein the structured output text corresponds to one or more patent document parts. The device may provide the structured output text.

20 Claims, 11 Drawing Sheets

500

510 — Identify a text from a document includes structured information, wherein the structured information is a set of patent claims 520 — Extract, from a structure of the structured information, a first one or more parts and a second one or more parts, wherein the first one or more parts are one or more grammatical parts and the second one or more parts are one or more legal parts 530 — Insert the first one or more parts and the second one or more parts into a structured model data object, wherein the structured model data object is a claim model data object 540 — Generate structured output text from the structured model data object, wherein the structured output text corresponds to one or more patent document parts 550 — Provide the structured output text

FIG. 5

TEXT GENERATION FOR PATENT APPLICATIONS USING NATURAL LANGUAGE MODELING AND PROGRAMMABLE TEMPLATING LANGUAGE

CROSS-REFERENCE TO RELATED APPLICATION

This patent application claims priority to U.S. Provisional Patent Application No. 63/199,073, filed on Dec. 4, 2020, and entitled "TEXT GENERATION FOR PATENT APPLICATION USING NATURAL LANGUAGE MODELING AND PROGRAMMABLE TEMPLATING LANGUAGE." The disclosure of the prior application is considered part of and is incorporated by reference into this patent application.

BACKGROUND

A system may use natural-language generation (NLG) techniques to transform structured data into natural language. For example, a system may use NLG techniques to automate reports, provide content for news articles, or communicate with a user (e.g., by providing a chatbot functionality), among other examples. Similarly, a system may use natural language understanding (NLU) techniques to process input natural language text and generate a mathematical model of the input natural language text from which a semantic meaning can be derived. For example, the system may use NLU techniques to process natural language queries from a user and provide responses to the natural language queries. In this case, the system may use NLG techniques to provide the responses in natural language.

SUMMARY

In some implementations, a method includes identifying, by a device, a text from a document that includes structured information, wherein the structured information is a set of patent claims; extracting, by the device from a structure of the structured information, a first one or more parts and a second one or more parts, wherein the first one or more parts are one or more grammatical parts and the second one or more parts are one or more legal parts; and inserting, by the device, the first one or more parts and the second one or more parts into a structured model data object, wherein the structured model data object is a claim model data object; generating, by the device, structured output text from the structured model data object, wherein the structured output text corresponds to one or more patent document parts; and providing, by the device, the structured output text.

In some implementations, a device comprises a memory and one or more processors, wherein the one or more processors are configured to: identify a text from a document that matches a structure of patent claims; extract the structure of patent claims into grammatical and legal parts; and place the extracted parts into a claim model data object.

In some implementations, a system comprises one or more devices configured to: identify, using a patent automation tool, a text from a document that matches a structure of patent claims; extract, using the patent automation tool, the structure of patent claims into grammatical and legal parts; and place, using the patent automation tool, the extracted parts into a claim model data object.

BRIEF DESCRIPTION OF THE DRAWINGS

FIGS. 5-7 are flowcharts of example processes relating to text generation for patent applications using natural language modeling and programmable templating language.

DETAILED DESCRIPTION

Figure 1A:
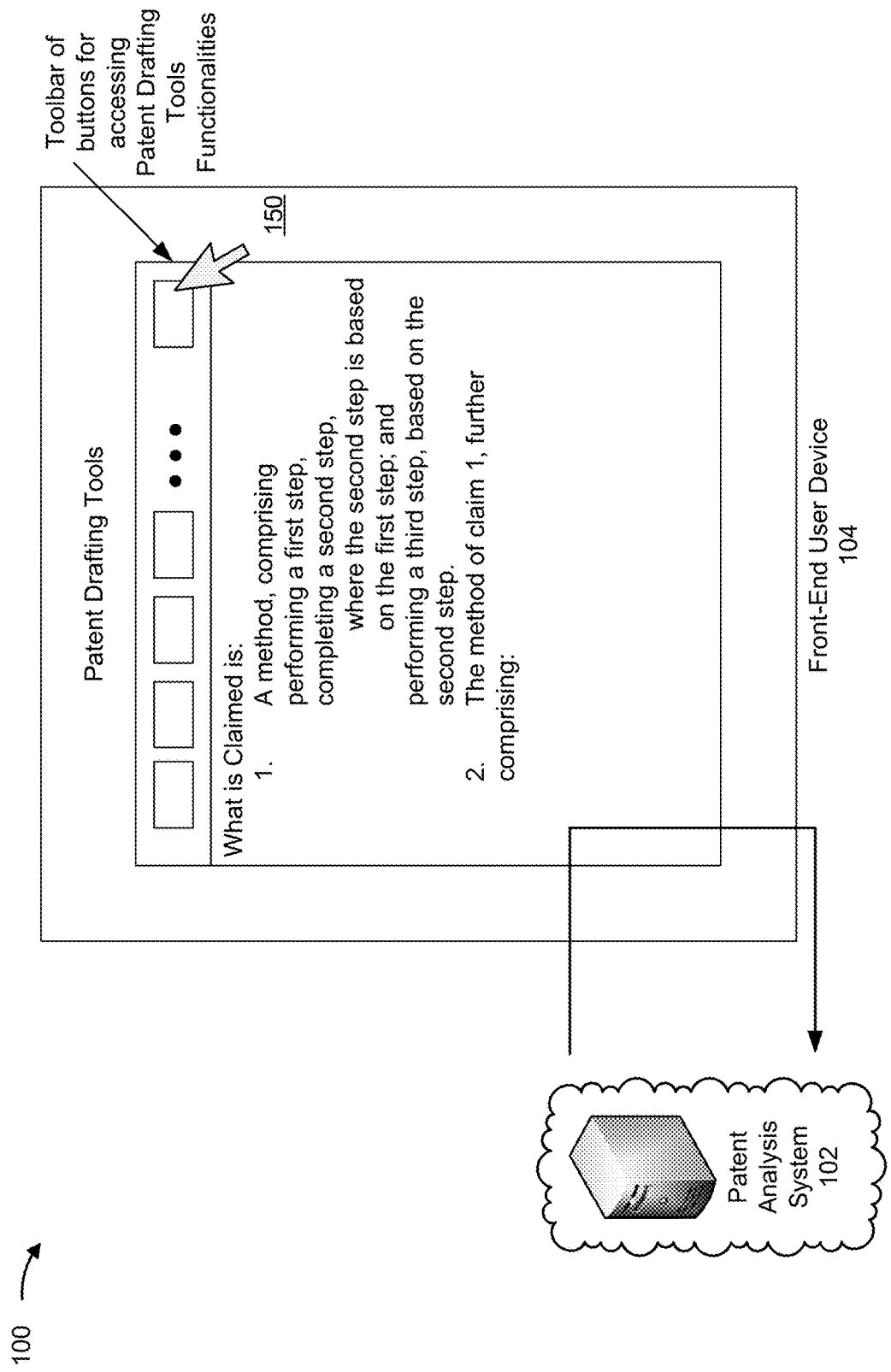
FIGS. 1A-1C are diagrams of an example implementation described herein.

The following detailed description of example implementations refers to the accompanying drawings. The same reference numbers in different drawings may identify the same or similar elements.

A system may use a machine learning model to process input text and generate output text. For example, based on training a machine learning model on a particular corpus, such as a corpus of patent applications or sections thereof, the system may deploy the machine learning model for patent application drafting. In this case, the system may receive input text corresponding to a first portion of a patent application or information relating to a patent application, and the system may use the machine learning model to generate a second portion of the patent application. However, such machine learning models may result in inconsistent output that fails to follow desired forms for the patent application. In another case, the system may use entity and semantic intent extraction techniques to extract entities and intents that can be used to generate portions of a patent application. However, such techniques may be limited in a level of semantic information that is extractable and usable. In yet another case, the system may use regular expressions to extract components of a corpus, such as components of a patent application, and generate new components for the patent application or other patent applications based on the extracted components. However, the use of regular expressions may limit a flexibility of an output from the system.

Some aspects described herein enable preparation of highly accurate output text in a patent application by using one or more natural language models coupled with a programmable templating language. For example, a system may perform natural language processing (NLP) using a plurality of component processes, such as a first natural language understanding (NLU) process and a second natural language generation (NLG) process. As a specific example, for NLU, a system may use an NLP platform, such as a spaCy modularizable platform. The system may use a templating language (e.g., used for templating websites), such as Handlebars, and may embed logic in a generated template. Templating languages may be used for generating HTML, but may not be well suited to generating formatted patent document text. Accordingly, the system may deploy a set of helper functions and logic to translate the template text to a format useable in a word processing environment, such as in MICROSOFT WORD. The system may extend a functionality of an underlying engine of the templating language with functions that manipulate the text based on a data model presented by the NLP platform. In this way, the system may generate precise text (e.g., more precisely output based on a given input text than is achieved with, for example, autoregressive language models, such as GPT-3 style free-form) that is more multi-dimensional than a template type output (e.g., in which words are filled into a static template). In some implementations, an output model of the system is stored in template space rather than in custom code, which enables a user of the system to directly manipulate the output of an NLG process of the system with all of the data provided by a natural language parser of the system.

Figure 1B:
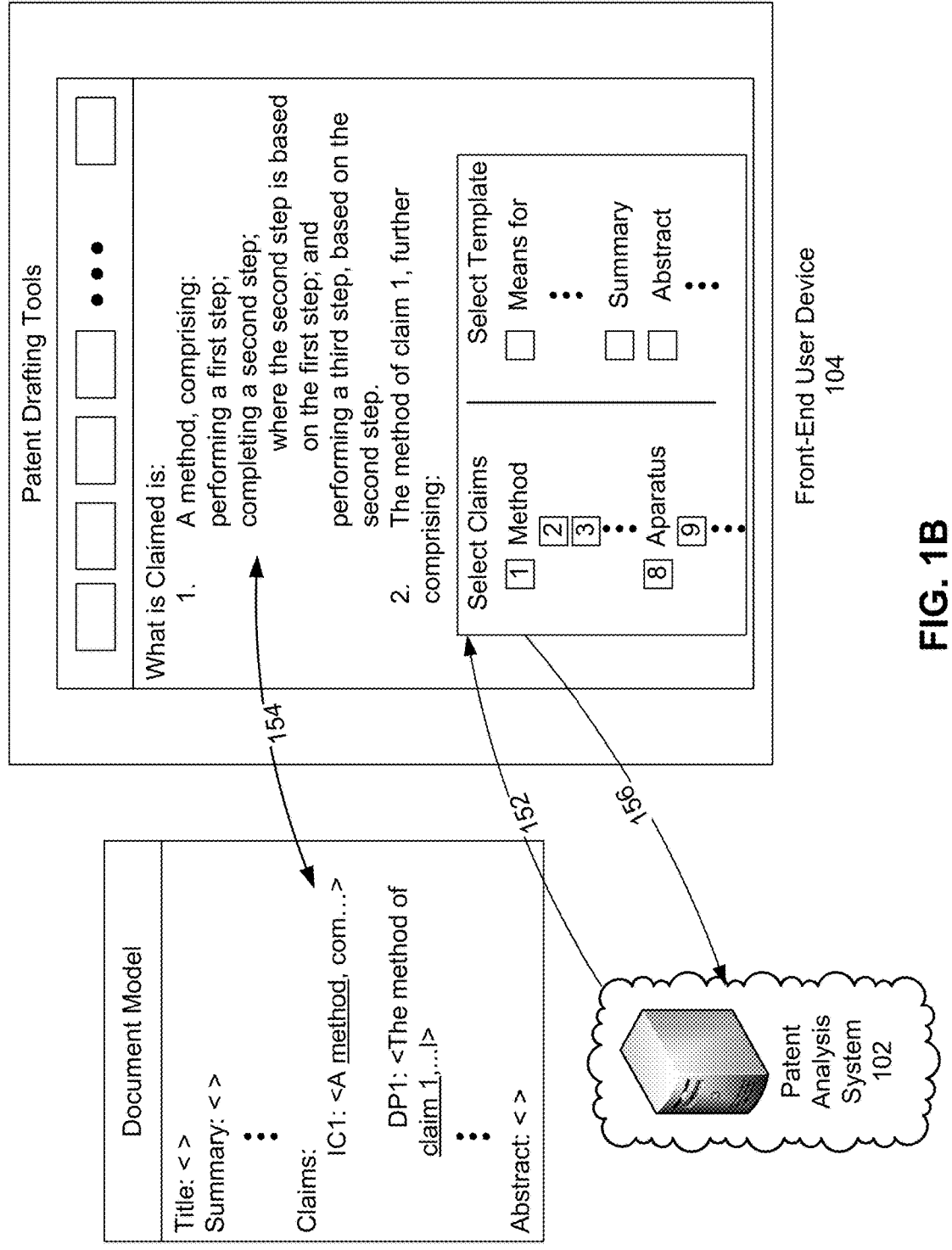
Figure 1C:
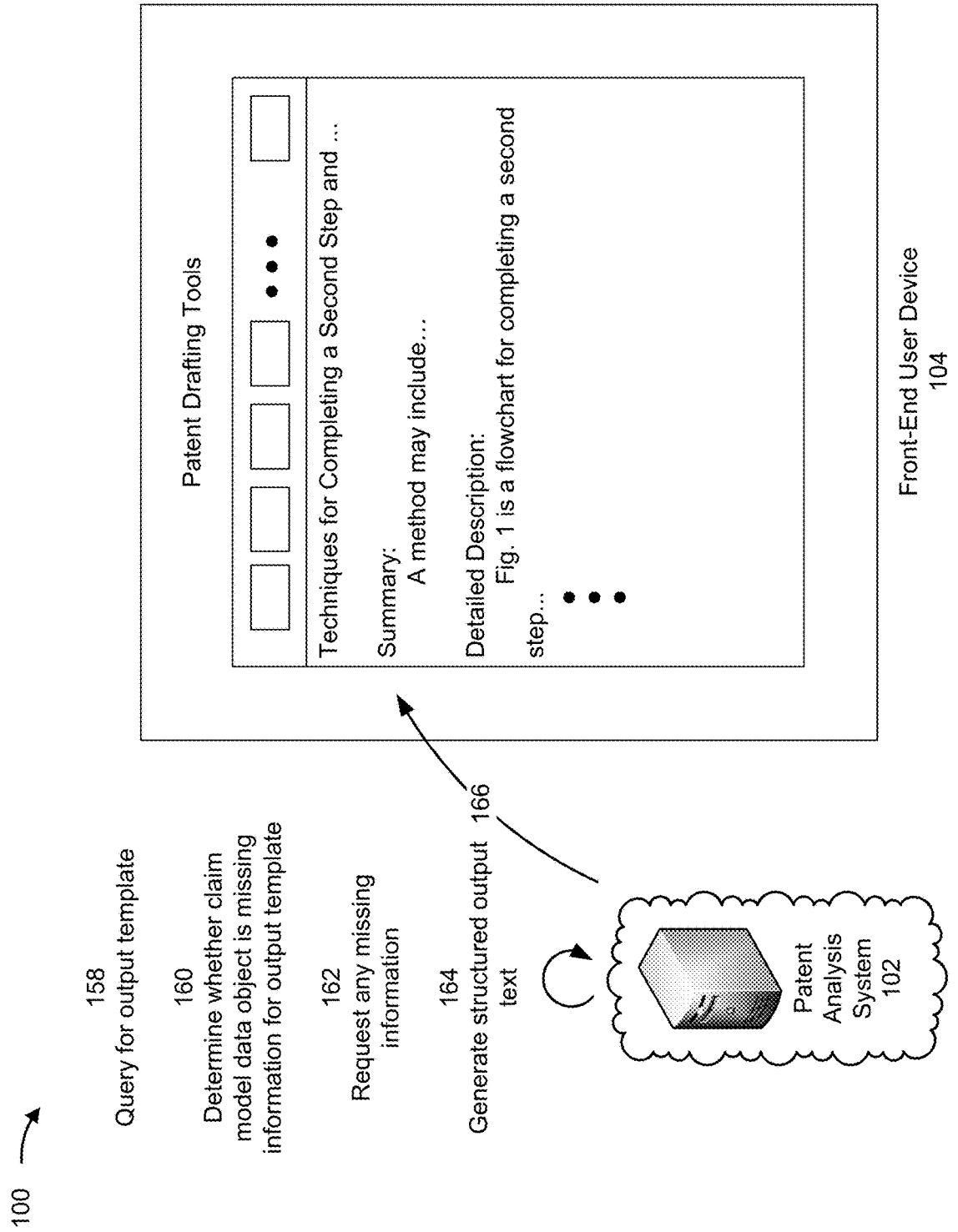

FIGS. 1A-1C are diagrams of an example implementation 100 associated with text generation for patent applications using natural language modeling and programmable templating language. As shown in FIGS. 1A-1C, example implementation 100 includes a patent analysis system 102 that may communicate with a front-end user device 104 to provide a patent drafting tools user interface. These devices are described in more detail below in connection with FIG. 3 and FIG. 4. In some implementations, patent analysis system 102 may expose functionalities of the patent drafting tools user interface via an add-in to a word processing application. For example, patent analysis system 102 may communicate with a toolbar add-in for MICROSOFT WORD to expose text generation functionalities to a user.

Figure 2A:
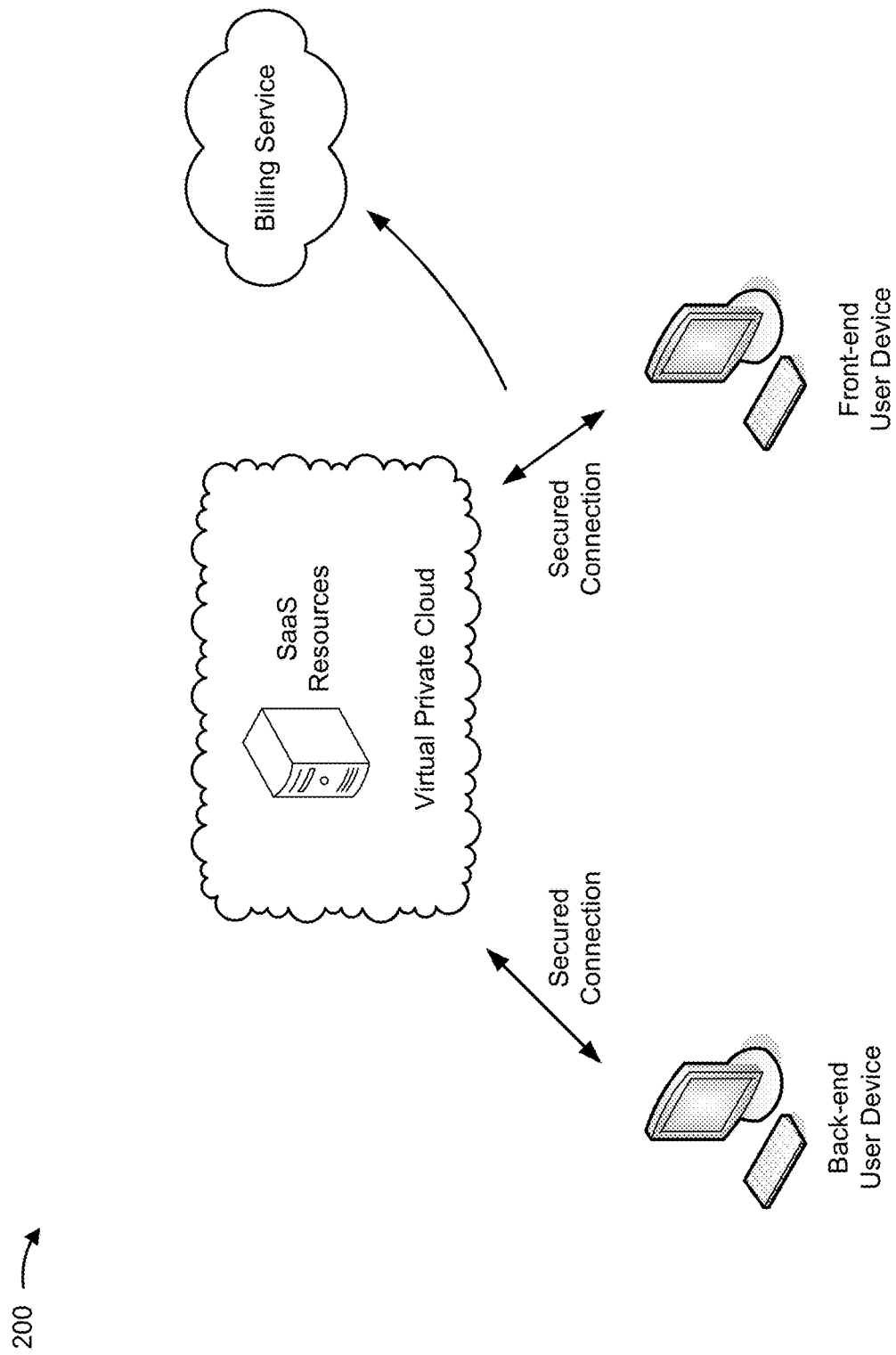
FIGS. 2A-2C are system architecture diagrams for deploying an example implementation described herein.
Figure 2B:
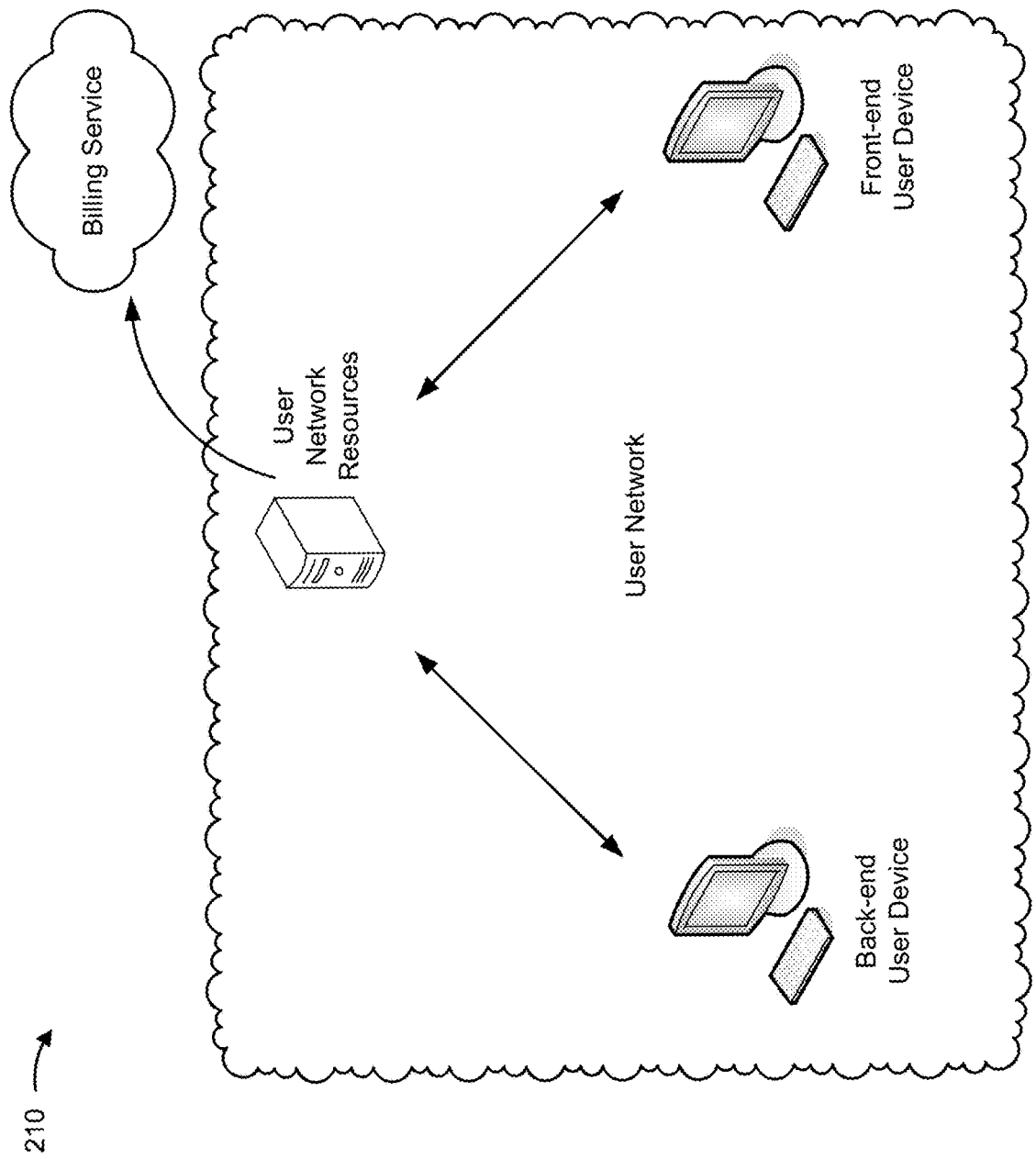
Figure 2C:
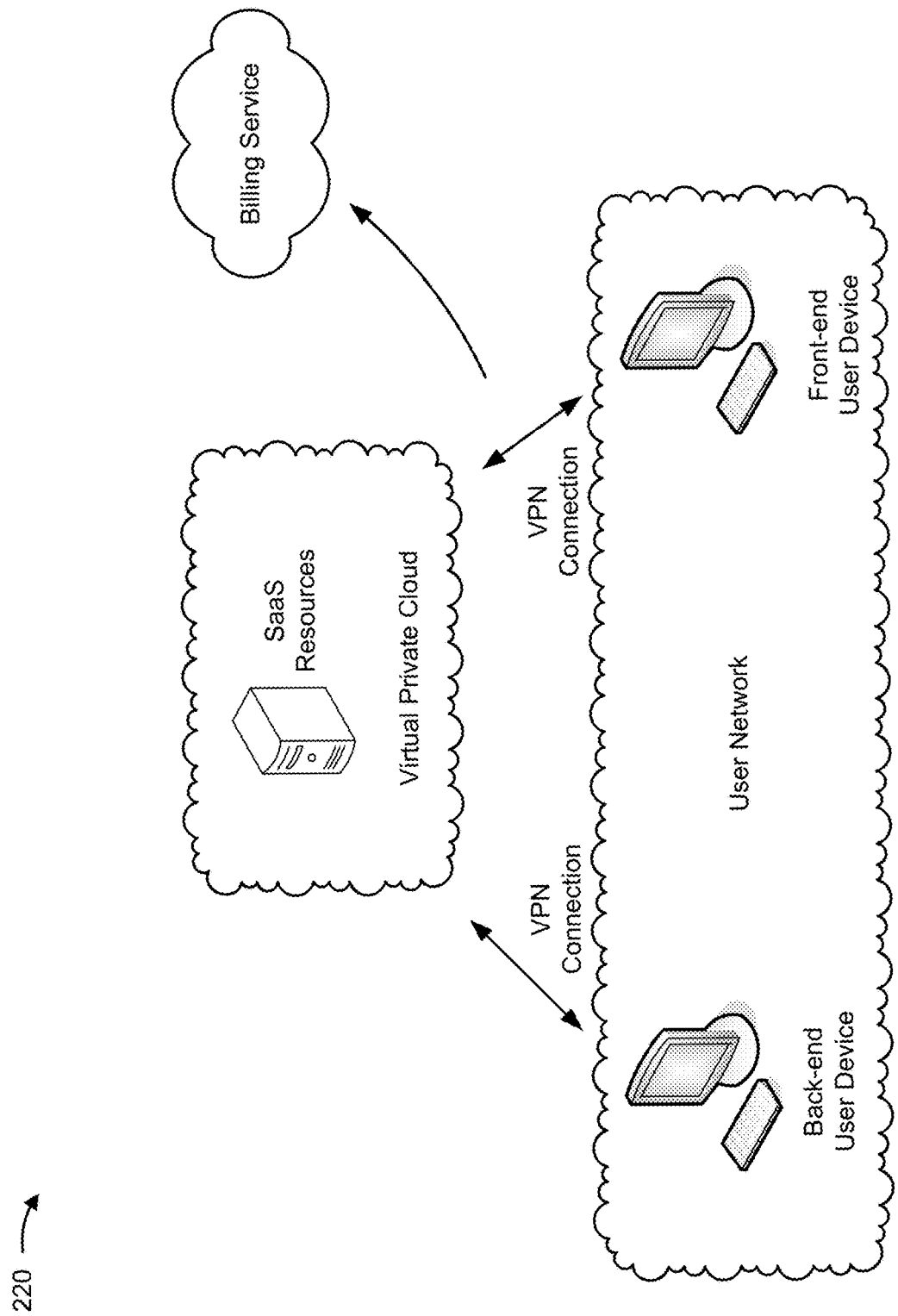

As shown in FIG. 1A, patent analysis system 102 may, via a deployment configuration described in more detail with regard to FIGS. 2A-2C, provide a set of patent drafting tools, such as via a word processing application add-in of a word processing application being executed on front-end user device 104. In some implementations, patent analysis system 102 may monitor use of the word processing application in real-time. For example, patent analysis system 102 may communicate with front-end user device 104 to monitor and analyze text entered into a document via the word processing application as the text is entered via user input. Additionally, or alternatively, patent analysis system 102 may asynchronously receive and analyze text entered into the word processing application, such as based on a user selection of a functionality of patent analysis system 102 via the toolbar. For example, when a user interaction with an input of front-end user device 104 selects a functionality (e.g., to analyze patent claims of a document), front-end user device 104 may transmit the document to patent analysis system 102 (e.g., via a network connection, a virtual private network (VPN) connection, or a secure connection, among other examples) and patent analysis system 102 may analyze the document as a response to the selection of the functionality.

In some implementations, front-end user device 104 may communicate with patent analysis system 102 based on performing an authentication procedure. For example, front-end user device 104 may provide a login user interface module into which a user may input a set of login credentials (e.g., a user name, a password, or an access code, among other examples). In this case, front-end user device 104 may transmit the set of login credentials to an authentication service of patent analysis system 102 (e.g., implemented via, for example, a Kubernetes microservice container). In this case, patent analysis system 102 may evaluate the set of login credentials and, based on approving the set of login credentials, transmit authorization information to front-end user device 104 to enable front-end user device 104 to activate and provide the patent drafting tools as an add-in to a word processing application. For example, patent analysis system 102 may provide an application programming interface (API) token that activates the patent drafting tools for use by a user of front-end user device 104.

As further shown in FIG. 1A, and by reference number 150, based on a user interaction with a user interface, patent analysis system 102 may receive a request to perform a functionality. For example, based on a user selection of a button associated with a functionality, front-end user device 104 may transmit a request for information identifying a set of available templates or a set of options associated with the set of available templates, among other examples. In this case, front-end user device 104 may transmit, to patent analysis system 102, an API token to indicate the request. In some implementations, the set of templates may be user-generated. For example, a user may script a template using a templating language and may provide the template to patent analysis system 102 via a back-end user device, as described in more detail herein. In this case, patent analysis system 102 may store the template to provide, based on a request, the template to front-end user device 104.

In some implementations, patent analysis system 102 may provide access to a templating language with which to generate user-creatable templates. For example, patent analysis system 102 may implement Handlebars templating language and may allow logic to be embedded in a generated template. In this case, patent analysis system 102 may deploy a set of helper functions and the logic embedded in the template to improve translation of template text into a format useable in a word processing environment (e.g., in MICROSOFT WORD). For example, patent analysis system 102 may receive a template that enables insertion of text into the template, and the template may be dynamically reconfigurable based on an underlying logic and a set of helper functions. This "dynamic template" may enable improved precision in text generation (e.g., a more precise output) than is achieved with, for example, an autoregressive language model and that provides more useable (e.g., accurate) output than is achieved with a static template.

In some implementations, patent analysis system 102 may include one or more looping functions or logical operators in a template. For example, a template may include a function for identifying a claim that may be used in connection with a loop to identify multiple claims. Similarly, a template may include a function for generating a sentence based on input of claim language, which may be looped to generate a plurality of sentences based on inputs of claim language. Similarly, the templating language may include logical operators to implement logic with regard to dynamically altering which portions of the template to use and/or which functions to use to manipulate, for example, claim language when generating new language as output from a template. In some implementations, a template may include a set of sub-templates. For example, patent analysis system 102 may include a template for generating a natural language sentence based on a claim limitation, which may be included as a sub-template in an abstract generation template. In this case, the abstract generation template may loop the natural language sentence generation template to generate a plurality of sentences for a plurality of claim limitations. Similarly, a document generation template may include the abstract generation template, a summary section generation template, or a flow chart generation template, among other examples as sub-templates to generate whole portions of a patent application using a single master template.

As shown in FIG. 1B, and by reference number 152, patent analysis system 102 may provide information identifying a set of templates and/or options. For example, patent analysis system 102 may transmit information identifying a set of valid templates and/or options (e.g., for the templates) for display via a user interface of front-end user device 104 (e.g., via a pop-up window, a toolbar window, or another type of user interface element associated with the word processing application). In this case, as shown, patent analysis system 102 may provide a user interface element with which a user may select claims, from a claims section of the document, for processing, and templates with which to process the claims. In some implementations, patent analysis system 102 may identify the claims based on processing text of the document. For example, patent analysis system 102 may identify the claims based at least in part on a format of the claims (e.g., use of a particular formatting style, such as use of numbering or tabbing to indicate that a portion of the text includes claims), a content of the claims (e.g., use of a particular word or set of words, such as "What is Claimed is:" indicating that subsequent text will be claims), or a semantic content of the claims (e.g., identifying, using NLP techniques, that certain words are meant to indicate a boundary of a patent, such as a section within the patent a portion of a document that includes patent text, among other examples), among other examples.

In this case, as shown by reference number 154, patent analysis system 102 may construct a document model based on processing the text. For example, patent analysis system 102 may process the text of the document to identify a portion of the document that is a title, a summary, a set of claims (e.g., to identify an independent claim ("IC1"), a statutory class of the independent claim, a dependent claim ("DP1") with a dependency to a particular independent claim, etc.), or an abstract, among other examples. In some implementations, patent analysis system 102 may generate the document model based on extracting structured information from the document. For example, a patent document may include structured information, such as patent claims, and patent analysis system 102 may use NLP techniques to extract first parts of the document that correspond to grammatical parts of the document (e.g., grammatical relationships between terms) and second parts of the document that correspond to legal parts of the document (e.g., semantic meanings of terms in the documents). In this case, patent analysis system 102 may insert the parts of the document into a document model, such as a claim model data object. In this way, patent analysis system 102 restructures the text from a first structure in the document (e.g., that is understandable to a human) to a second structure in the document model (e.g., that is understandable to patent analysis system 102). In this case, patent analysis system 102 may store the document model in template space. For example, patent analysis system 102 may store the document model as a set of entries into a template that includes templating language and underlying logic, which may enable a user of front-end user device 104 to directly manipulate an output of an NLG process.

In some implementations, patent analysis system 102 may perform natural language processing on text of the document using a set of component processes. For example, patent analysis system 102 may perform a natural language understanding (NLU) process on text of the document to break segments of the text (e.g., sentences) into an internal representation, such as into grammatical parts or legal (semantic) parts, among other examples. In this case, as a specific example, patent analysis system 102 may use an NLP platform, such as a spaCy modularizable platform, to implement an NLU processing functionality. Additionally, or alternatively, patent analysis system 102 may use other natural language processing techniques, such as symbolic NLP techniques, statistical NLP techniques, neural network based NLP techniques, or cognitive computing based NLP techniques, among other examples.

As further shown in FIG. 1B, and by reference number 156, patent analysis system 102 may receive a request to process information using a particular template. For example, patent analysis system 102 may receive a request to process a particular subset of a set of claims in the document using a particular template (e.g., a template for converting the claims to a different statutory class, a template for generating a summary based on the claims, a template for generating an abstract based on the claims, etc.).

As shown in FIG. 1C, and by reference numbers 158-164, patent analysis system 102 may perform a set of procedures associated with generating structured output text. For example, as shown by reference number 158, patent analysis system 102 may query for an output template. In this case, patent analysis system 102 may identify an output template corresponding to a user selection via a user interface as described above. Based on querying for the output template, patent analysis system 102 may obtain the output template, compare the output template to information included in the document model (e.g., which may be a claim model data object), and determine, using an NLP parser, whether the document model is missing any information for the output template, as shown by reference number 160. For example, when patent analysis system 102 is generating specification text, based on a method claim, to accompany a flow chart figure, patent analysis system 102 may identify the method claim in the document model and dependencies for dependent claims to describe with regard to the flow chart figure in the document model, but may determine that information is missing regarding which figure number is to represent the flow chart figure. In this case, patent analysis system 102 may communicate with front-end user device 104 to provide a user interface element with which to receive user input selecting the flow chart figure or other missing information, as shown by reference number 162. In some implementations, patent analysis system 102 may return structured data to front-end user device 104 that may cause an options dialog to be provided via front-end user device 104. In this case, front-end user device 104 may provide, as a response, structured data or options selections, among other examples, to patent analysis system 102 (e.g., for processing using NLP text generation techniques) based on receiving user input via, for example, the options dialog.

Additionally, or alternatively, patent analysis system 102 may automatically obtain missing information. For example, patent analysis system 102 may use computer vision techniques to analyze a figures document and identify a figure, in the figures document, that includes text corresponding to text of the claims or that includes a set of flow chart objects (e.g., process blocks or decision blocks, among other examples) that correspond to a semantic relationship between steps in the aforementioned method claim, among other examples. In some implementations, based on obtaining the missing information, patent analysis system 102 may insert the missing information into the document model. For example, patent analysis system 102 may insert information identifying a figure that is a flow chart figure, a name for a device that is being claimed, or a part number for the device that is being named, among other examples.

Further, as shown by reference number 164, patent analysis system 102 may generate structured output text. For example, patent analysis system 102 may use one or more templates (e.g., which include embedded logic) and NLG techniques to process the document model (e.g., generated using NLP techniques or NLU techniques) to generate structured output text. In this case, patent analysis system 102 may use a set of helper functions, programmable logic, and other techniques to assist in generating formatted patent document text from the templates, thereby achieving improved precision relative to using only a set of templates. The improved precision may correspond to a higher degree of consistency at generating output text from a given input text relative to a static template (e.g., inserting words into static spaces in a template).

In some implementations, patent analysis system 102 may generate a set of claims based on the document model. For example, based on a user selection and the document model including claims of a first statutory class (e.g., a method class), patent analysis system 102 may generate claims of a second statutory class (e.g., an apparatus class) by altering a verb tense, changing wordings, or identifying claim dependencies, among other examples. Additionally, or alternatively, patent analysis system 102 may modify claims to generate a set of claims. For example, when a first set of claims in a document model cover an invention in terms of a first device that is communicating with a second device, patent analysis system 102 may automatically generate claims that cover the invention in terms of the second device, which is communicating with the first device. In this case, patent analysis system 102 may use the template and a set of logical functions to perform actions to modify the first set of claims, such as by changing wordings (e.g., changing "transmitting" to "receiving" to reflect covering the invention in terms of the second device), changing verb tenses (e.g., changing an active verb, such as "that was determined" to a passive recitation of the verb, such as "that has been determined"), or changing an order of steps (e.g., based on a semantic meaning of the steps), among other examples. As a specific example, patent analysis system 102 may convert "A method, comprising: performing, by a device, a first step; completing, by the device, a second step; . . . " to "A device, comprising: one or more processors configured to: perform a first step; complete a second step; . . . ". In this case, patent analysis system 102 extracts an entity (e.g. "a device/the device") from each step, changes a preamble (e.g., "A method, comprising" becomes "A device, comprising: one or more processors configured to:" based on the extracted entity), and changes verb tenses (e.g., "performing" becomes "perform").

In some implementations, patent analysis system 102 may generate non-claim text for the document. For example, patent analysis system 102 may generate an abstract based on an independent claim. In some implementations, patent analysis system 102 may evaluate one or more document rules based on logic in a template that patent analysis system 102 is using to generate the non-claim text. For example, patent analysis system 102 may evaluate a word count rule to determine whether a generated abstract satisfies a maximum word count. In this case, patent analysis system 102 may obtain the word count rule from a user specification during template generation or may use artificial intelligence to automatically determine the word count rule by parsing a set of rules (e.g., rules taken from the Manual of Patent Examining Procedure (MPEP)) to identify an explicitly-stated rule, or by parsing a set of patent documents, such as a corpus of patent applications, to derive a rule.

In some implementations, to generate an abstract, patent analysis system 102 may use NLP processes or a user selection to select an independent claim with, for example, a broadest claim scope. In this case, patent analysis system 102 may convert the independent claim into natural language for an abstract. In this case, patent analysis system 102 may combine templated language (e.g., "In some implementations, <blank>") with logic to rearrange terms of the independent claim into one or more sentences, rearrange an order of words in the one or more sentences to preserve a semantic meaning, or insert one or more words into the one or more sentences (e.g., insert a noun representing a device, identified in a preamble, which performs steps of the method), among other examples. As a specific example, patent analysis system 102 may generate, based on the independent claim steps "completing a second step . . . " and "performing a third step . . . ", a title for the patent application "Techniques for Completing a Second Step and Performing a Third Step Based on Performance of a First Step". In this case, patent analysis system 102 rearranges an order of the steps and alters a tense of multiple words, among other examples, combined with a templating form (e.g. "Techniques for <the semantic action of the independent claim>"). Similarly, patent analysis system 102 generates a summary and a flow chart by extracting and converting portions of the claims or other portions of patent document that have already been completed (e.g., by a user or by previous use of patent analysis system 102).

As further shown in FIG. 1C, and by reference number 166, patent analysis system 102 may provide output. For example, patent analysis system 102 may insert content into the document, such as inserting a natural language summary, a natural language flow chart description, or a set of claims of a different statutory class than those written by the user, among other examples. In some implementations, patent analysis system 102 may insert one or more sentences. For example, patent analysis system 102 may automatically insert a sentence into a patent application specification. Additionally, or alternatively, patent analysis system 102 may insert one or more paragraphs into the patent application specification. In this case, patent analysis system 102 may insert the one or more paragraphs directly into the patent application document as structured information, which patent analysis system 102 may process to update a document model of the patent application document.

In some implementations, patent analysis system 102 may log analytics and usage data based on providing generated text. For example, patent analysis system 102 may track changes to the generated text in the word processing application and may use the data identifying the changes to perform guided machine learning to update NLP or NLG models, among other examples. In this way, patent analysis system 102 learns from expert users of patent analysis system 102 and improves the NLP or NLG models using fewer computing resources than if training was performed using a dedicated training procedure. Additionally, or alternatively, patent analysis system 102 may track usage of patent analysis system 102 to facilitate, for example, software-as-a-service (SaaS) billing of usage of patent analysis system 102.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

FIGS. 2A-2C are diagrams of example implementations 200/210/220 associated with text generation for patent applications. As shown in FIGS. 2A-2C, example implementations 200/210/220 include a set of user devices and a set of resources, such as resources of a cloud computing environment. These devices are described in more detail below in connection with FIG. 3 and FIG. 4.

As shown in FIG. 2A, in a software-as-a-service (SaaS) configuration, a patent analysis system, as described in more detail herein, may be deployed via a back-end user device, a set of resources in a virtual private cloud (VPC), and a front-end user device. For example, the back-end user device may connect, via a first secured connection, to the resources of the VPC to manage templates or create customized logic, among other examples. The set of resources of the VPC may provide a set of microservices (e.g., a Kubernetes cluster with a set of microservices) that are managed as a service for a user of the back-end user device and the front-end user device. In some implementations, the back-end user device may initiate and/or access the secured connection via web-browser-based access. In some implementations, the front-end user device may be deployed via a word processing application add-in. For example, the front-end user device may include a MICROSOFT WORD application with an add-in to implement access to functionalities of the patent analysis system. In this case, the add-in may establish and use a second secured connection to the set of resources of the VPC. In some implementations, a separate analytics service may be implemented to monitor usage of the VPC and the patent analysis system functionalities thereof. For example, the patent analytics system may include or be synchronized with an analytics system that may track usage of the patent analytics system for debugging, billing, or authentication, among other examples.

As shown in FIG. 2B, in an on-premises deployment configuration, a patent analysis system may include a back-end user device, a set of user network resources, and a front-end user device. For example, the back-end user device, the set of user network resources, and the front-end user device may be deployed within a user network. In this case, the user network resources may include, for example, a Kubernetes cluster with a set of microservices, which may include an NLP engine, a private web-based administration platform (e.g., for management of templates or settings, among other examples, using the back-end user device).

As shown in FIG. 2C, in a joint management deployment configuration, devices of a user network (e.g., a back-end user device or a front-end user device) may use VPN connections between the user network and a cloud network to access a set of resources implementing the patent analysis system.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
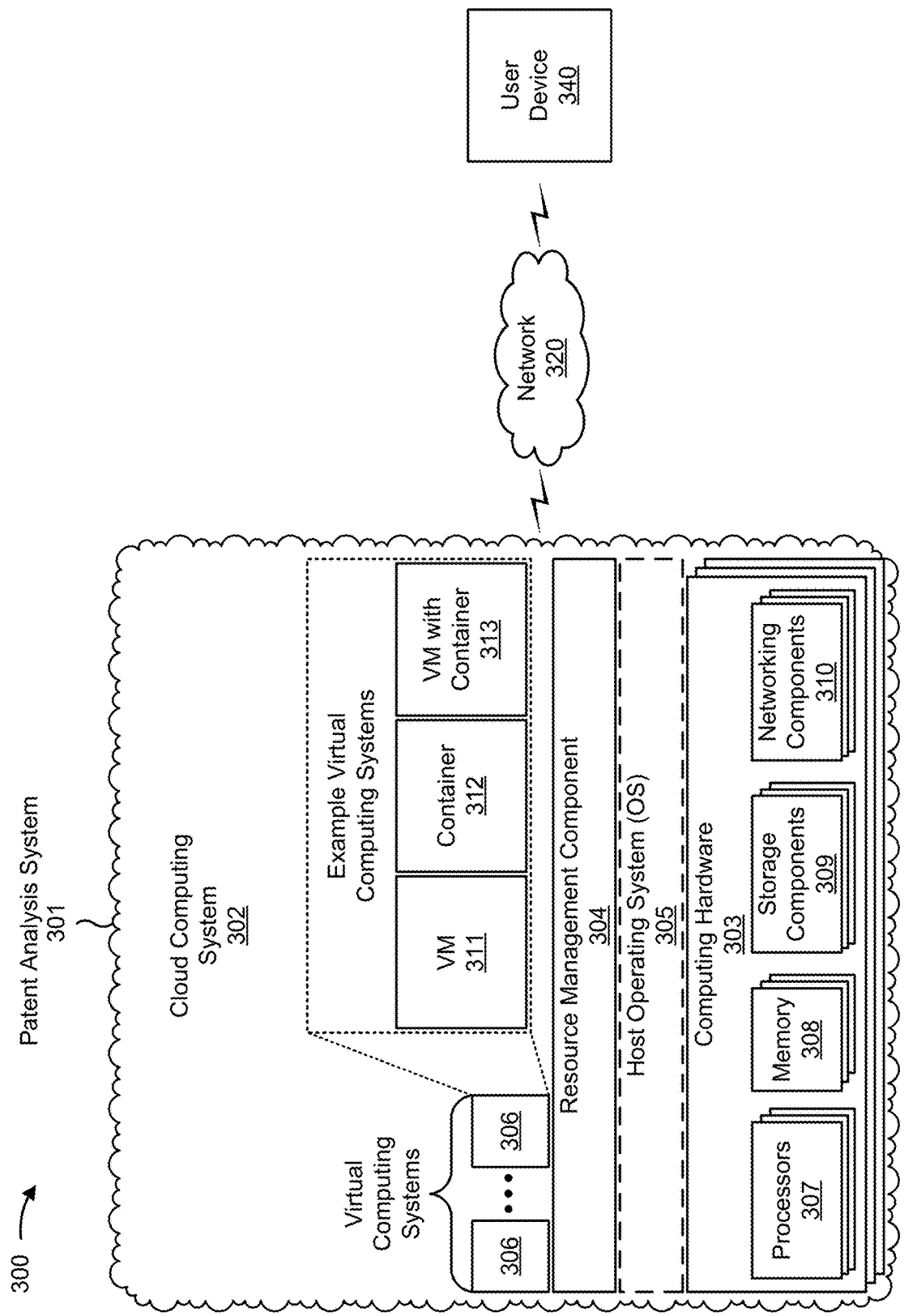
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a patent analysis system 301, which may include one or more elements of and/or may execute within a cloud computing system 302. The cloud computing system 302 may include one or more elements 303-313, as described in more detail below. As further shown in FIG. 3, environment 300 may include a network 320, and/or a user device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the patent analysis system 301 may include one or more elements 303-313 of the cloud computing system 302, may execute within the cloud computing system 302, and/or may be hosted within the cloud computing system 302, in some implementations, the patent analysis system 301 may not be cloud-based (e.g., may be implemented outside of a cloud computing system) or may be partially cloud-based. For example, the patent analysis system 301 may include one or more devices that are not part of the cloud computing system 302, such as device 400 of FIG. 4, which may include a standalone server or another type of computing device. The patent analysis system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The user device 340 includes one or more devices capable of receiving, generating, storing, processing, and/or providing information associated with text generation for patent applications, as described elsewhere herein. The user device 340 may include a communication device and/or a computing device. For example, the user device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
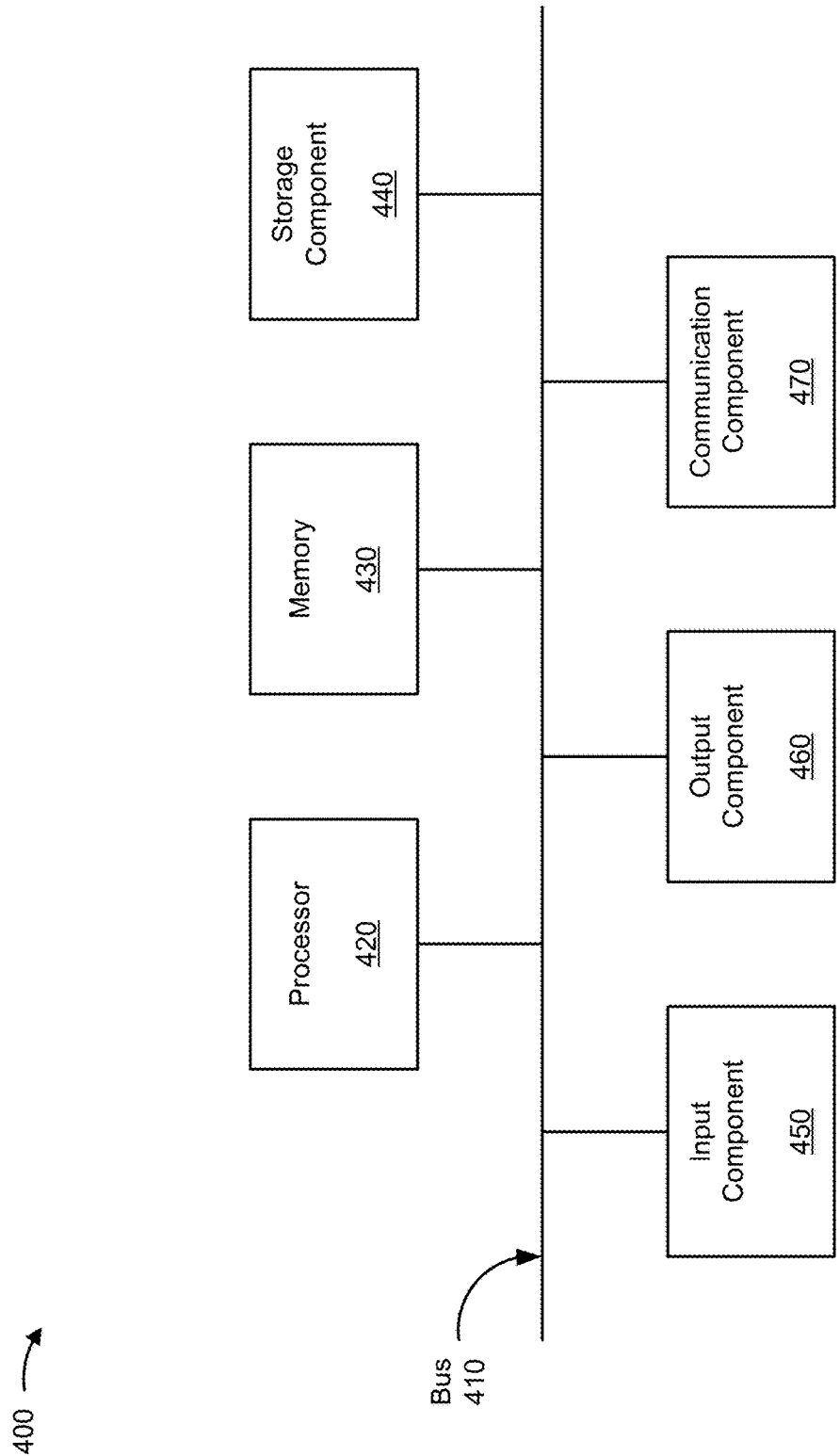
FIG. 4 is a diagram of example components of one or more devices of FIG. 3.

FIG. 4 is a diagram of example components of a device 400, which may correspond to patent analysis system 301 and/or user device 340. In some implementations, patent analysis system 301 and/or user device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with text generation for patent applications using natural language modeling and programmable templating language. In some implementations, one or more process blocks of FIG. 5 may be performed by a patent analysis system (e.g., patent analysis system 301). In some implementations, one or more process blocks of FIG. 5 may be performed by another device or a group of devices separate from or including the patent analysis system, such as a user device (e.g., user device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include identifying a text from a document that includes structured information, wherein the structured information is a set of patent claims (block 510). For example, the patent analysis system may identify a text from a document that includes structured information, wherein the structured information is a set of patent claims, as described above.

As further shown in FIG. 5, process 500 may include extracting a first one or more parts and a second one or more parts, wherein the first one or more parts are one or more grammatical parts and the second one or more parts are one or more legal parts (block 520). For example, the patent analysis system may extract a first one or more parts and a second one or more parts, wherein the first one or more parts are one or more grammatical parts and the second one or more parts are one or more legal parts, as described above.

As further shown in FIG. 5, process 500 may include inserting the first one or more parts and the second one or more parts into a structured model data object, wherein the structured model data object is a claim model data object (block 530). For example, the patent analysis system may insert the first one or more parts and the second one or more parts into a structured model data object, wherein the structured model data object is a claim model data object, as described above.

As further shown in FIG. 5, process 500 may include generating structured output text from the structured model data object, wherein the structured output text corresponds to one or more patent document parts (block 540). For example, the patent analysis system may generate structured output text from the structured model data object, wherein the structured output text corresponds to one or more patent document parts, as described above.

As further shown in FIG. 5, process 500 may include providing the structured output text (block 550). For example, the patent analysis system may provide the structured output text, as described above.

Process 500 may include additional implementations, such as any single implementation or any combination of implementations described below and/or in connection with one or more other processes described elsewhere herein.

In a first implementation, process 500 includes querying for an output template, determining whether the claim model data object is missing any information for the output template, selectively requesting missing information for the output template based at least in part on a result of determining whether the claim model data object is missing any information for the output template, selectively including the missing information in the claim model data object based at least in part on a result of selectively requesting the missing information, and generating the structured output text comprises generating the structured output text using the output template.

In a second implementation, alone or in combination with the first implementation, process 500 includes determining, using the claim model data object and an output template, a number of new claims to create, and generating claim language, for the number of new claims, by running template logic on the first one or more parts and the second one or more parts.

In a third implementation, alone or in combination with one or more of the first and second implementations, the template logic includes one or more looping functions.

In a fourth implementation, alone or in combination with one or more of the first through third implementations, the template logic includes one or more logical operators that evaluate conditions, and generating the claim language includes running the template logic based on the logical operators.

In a fifth implementation, alone or in combination with one or more of the first through fourth implementations, the template logic includes one or more helper functions that extend a template parsing functionality of a base engine of the patent analysis system.

In a sixth implementation, alone or in combination with one or more of the first through fifth implementations, the output template is user-creatable.

In a seventh implementation, alone or in combination with one or more of the first through sixth implementations, the output template includes one or more sub-templates according to one or more logic rules of the output template.

In an eighth implementation, alone or in combination with one or more of the first through seventh implementations, generating the structured output text includes converting the generated text into one or more paragraphs, wherein the one or more paragraphs are insertable into a text processing application, and providing the structured output text includes inserting the one or more paragraphs into the text processing application.

In a ninth implementation, alone or in combination with one or more of the first through eighth implementations, inserting the one or more paragraphs includes inserting the one or more paragraphs into the document that includes the structured information.

In a tenth implementation, alone or in combination with one or more of the first through ninth implementations, the text processing application is MICROSOFT WORD.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
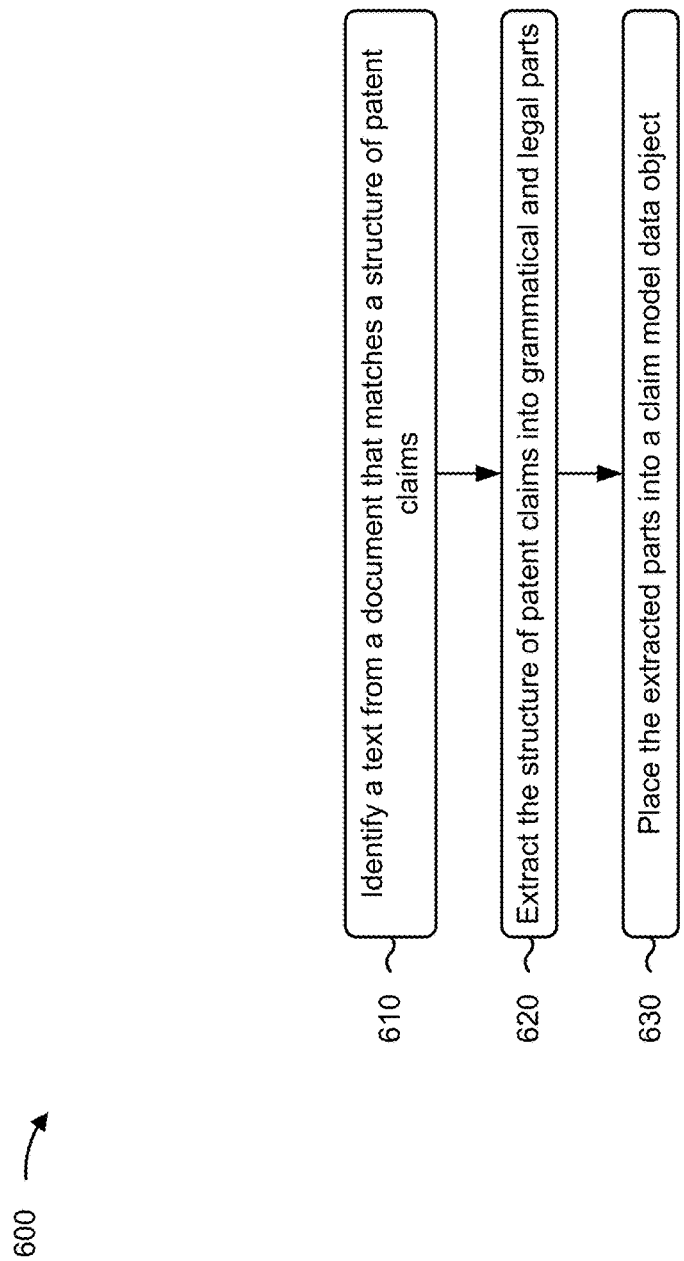

FIG. 6 is a flowchart of an example process 600 associated with text generation for patent applications using natural language modeling and programmable templating language. In some implementations, one or more process blocks of FIG. 6 may be performed by a patent analysis system (e.g., patent analysis system 301). In some implementations, one or more process blocks of FIG. 6 may be performed by another device or a group of devices separate from or including the patent analysis system, such as a user device (e.g., user device 340). Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include identifying a text from a document that matches a structure of patent claims (block 610). For example, the patent analysis system may identify a text from a document that matches a structure of patent claims, as described above.

As further shown in FIG. 6, process 600 may include extracting the structure of patent claims into grammatical and legal parts (block 620). For example, the patent analysis system may extract the structure of patent claims into grammatical and legal parts, as described above.

As further shown in FIG. 6, process 600 may include placing the extracted parts into a claim model data object (block 630). For example, the patent analysis system may place the extracted parts into a claim model data object, as described above.

Process 600 may include additional implementations, such as any single implementation or any combination of implementations described below and/or in connection with one or more other processes described elsewhere herein.

In a first implementation, process 600 includes querying a user for a desired output template; determining, using the desired output template, whether the claim model data object is missing any information; selectively obtaining the missing information based at least in part on a result of determining whether the claim model data object is missing any information; determining, using the claim model data object and the desired output template, a number of new claims to create; generating the number of new claims based on determining the number of new claims to create; and generating claim language, for the number of new claims, by running template logic on an extracted data model.

In a second implementation, alone or in combination with the first implementation, process 600 includes generating a user interface object and providing the claim model data object for display in the user interface object.

In a third implementation, alone or in combination with one or more of the first and second implementations, process 600 includes obtaining the text from a user-controlled device via a secured connection, and extracting the structure of patent claims into grammatical and legal parts includes processing the text in a virtual private cloud established for a user of the user-controlled device.

In a fourth implementation, alone or in combination with one or more of the first through third implementations, process 600 includes transmitting information identifying a result of generating the claim model data object to the user-controlled device via the secured connection for display.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
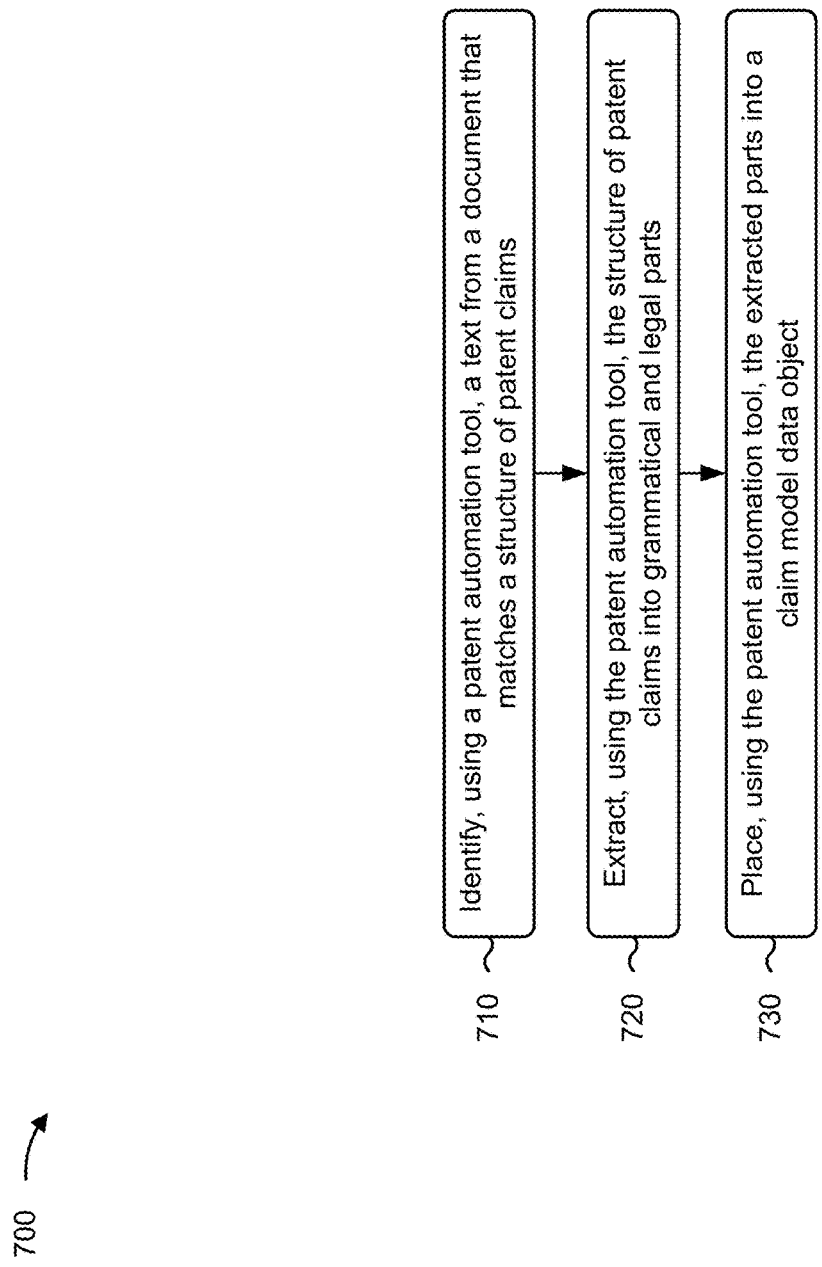

FIG. 7 is a flowchart of an example process 700 associated with text generation for patent applications using natural language modeling and programmable templating language. In some implementations, one or more process blocks of FIG. 7 may be performed by a system (e.g., patent analysis system 301). In some implementations, one or more process blocks of FIG. 7 may be performed by another device or a group of devices separate from or including the system. Additionally, or alternatively, one or more process blocks of FIG. 7 may be performed by one or more components of device 400, such as processor 420, memory 430, storage component 440, input component 450, output component 460, and/or communication component 470.

As shown in FIG. 7, process 700 may include identifying, using a patent automation tool, a text from a document that matches a structure of patent claims (block 710). For example, the system may identify, using a patent automation tool, a text from a document that matches a structure of patent claims, as described above.

As further shown in FIG. 7, process 700 may include extracting, using the patent automation tool, the structure of patent claims into grammatical and legal parts (block 720). For example, the system may extract, using the patent automation tool, the structure of patent claims into grammatical and legal parts, as described above.

As further shown in FIG. 7, process 700 may include placing, using the patent automation tool, the extracted parts into a claim model data object (block 730). For example, the system may place, using the patent automation tool, the extracted parts into a claim model data object, as described above.

Process 700 may include additional implementations, such as any single implementation or any combination of implementations described below and/or in connection with one or more other processes described elsewhere herein.

In a first implementation, the system includes a virtual private cloud established for a user and executing the patent automation tool, and the virtual private cloud is configured to establish a secure connection with a user-controlled device for back-end management of the patent automation tool and a user-controlled device for front-end usage of the patent automation tool.

In a second implementation, alone or in combination with the first implementation, the system is included in a user network and the user network includes a server for executing the patent automation tool, a user-controlled device for back-end management of the patent automation tool, and a user-controlled device for front-end usage of the patent automation tool.

In a third implementation, alone or in combination with one or more of the first and second implementations, the system includes a virtual private cloud established for a user and executing the patent automation tool, and the virtual private cloud is configured to establish a virtual private network connection with a user network that includes a user-controlled device for back-end management of the patent automation tool and a user-controlled device for front-end usage of the patent automation tool.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    identifying, by a device, a text from a document that includes structured information, wherein the structured information is a set of patent claims;
    extracting, by the device from a structure of the structured information, a first one or more parts and a second one or more parts, wherein the first one or more parts are one or more grammatical parts and the second one or more parts are one or more legal parts;
    inserting, by the device, the first one or more parts and the second one or more parts into a structured model data object, wherein the structured model data object is a claim model data object;
    identifying, by the device, an output template of a plurality of output templates associated with the structured model data object, each of the plurality of output templates including respective template logic for natural language generation of one or more patent document parts of the document,
        wherein template logic, included in the output template, includes one or more helper functions that extend a template parsing functionality of a base engine of the device, and
        wherein each of the plurality of output templates corresponds to different template logic;
    generating, by the device, structured output text from the structured model data object and the output template, wherein the structured output text corresponds to the one or more patent document parts; and
    providing, by the device, the structured output text.

2. The method of claim 1, further comprising:
    querying for the output template;
    determining whether the claim model data object is missing any information for the output template;
    selectively requesting missing information for the output template based at least in part on a result of determining whether the claim model data object is missing any information for the output template; and
    selectively including the missing information in the claim model data object based at least in part on a result of selectively requesting the missing information.

3. The method of claim 1, further comprising:
    determining, using the claim model data object and the output template, a number of new claims to create; and
    generating claim language, for the number of new claims, by running the template logic included in the output template on the first one or more parts and the second one or more parts.

4. The method of claim 3, wherein the template logic includes one or more logical operators that evaluate conditions and,
    wherein generating the claim language comprises:
        running the template logic based on the logical operators.

5. The method of claim 1, wherein the template logic included in the output template includes one or more looping functions.

6. The method of claim 1, wherein the output template includes one or more sub-templates according to one or more logic rules of the output template.

7. The method of claim 6, wherein generating the structured output text comprises:
    executing template logic included in each of the one or more sub-templates included in the output template.

8. The method of claim 1, wherein generating the structured output text comprises:
    converting the structured output text into one or more paragraphs, wherein the one or more paragraphs are insertable into a text processing application; and
    wherein providing the structured output text comprises:
        inserting the one or more paragraphs into the text processing application.

9. The method of claim 8, wherein inserting the one or more paragraphs comprises:
    inserting the one or more paragraphs into the document that includes the structured information.

10. The method of claim 1, wherein generating the structured output text comprises:
    dynamically generating the structured output text using the structured model data object, the output template, and the one or more helper functions,
        wherein each of the one or more helper functions are configured to dynamically generate a corresponding portion of the structured output text.

11. The method of claim 1, wherein generating the structured output text comprises:
    generating the structured output text by executing the one or more helper functions.

12. A device comprising:
    one or more memories; and
    one or more processors, wherein the one or more processors are configured to:
        identify a text from a document that matches a structure of patent claims;
        extract the structure of patent claims into grammatical and legal parts;
        place the grammatical and legal parts into a claim model data object;
        identify an output template of a plurality of output templates associated with the claim model data object, each of the plurality of output templates including respective template logic for natural language generation of one or more patent document parts of the document,
            wherein template logic, included in the output template, includes one or more helper functions that extend a template parsing functionality of a base engine of the device, and
            wherein each of the plurality of output templates corresponds to different template logic;
        generate output text from the claim model data object and the output template, wherein the output text corresponds to the one or more patent document parts; and
        provide the output text.

13. The device of claim 12, wherein the one or more memories and the one or more processors are further configured to:

query for the output template;
determine, using the output template, whether the claim model data object is missing any information;
selectively obtain the missing information based at least in part on a result of determining whether the claim model data object is missing any information; and
determine, using the claim model data object and the output template, a number of new claims to create,
wherein, when generating the output text, the one or more memories and the one or more processors are configured to generate the number of new claims for inclusion in the output text.

14. The device of claim 12, wherein the one or more memories and the one or more processors are further configured to:
generate a user interface object; and
provide the claim model data object for display in the user interface object.

15. The device of claim 12, wherein, when identifying the text, the one or more meomries and the one or more processors are configured to:
obtain the text from a user-controlled device via a secured connection; and
wherein, when extracting the structure of patent claims into grammatical and legal parts, the one or more memories and the one or more processors are further configured to:
process the text in a virtual private cloud established for a user of the user-controlled device.

16. The device of claim 15, wherein the one or more memories and the one or more processors are further configured to:
transmit information identifying a result of generating the claim model data object to the user-controlled device via the secured connection for display.

17. A system comprising:
one or more hardware devices configured to:
identify, using a patent automation tool, a text from a document that matches a structure of patent claims;
extract, using the patent automation tool, the structure of patent claims into grammatical and legal parts;
place, using the patent automation tool, the grammatical and legal parts into a claim model data object;
identify an output template of a plurality of output templates associated with the claim model data object, each of the plurality of output templates including respective template logic for natural language generation of one or more patent document parts of the document,
wherein template logic, included in the output template, includes one or more helper functions that extend a template parsing functionality of a base engine of the device, and
wherein each of the plurality of output templates corresponds to different template logic;
generate output text from the claim model data object and the output template, wherein the output text corresponds to the one or more patent document parts; and
provide the output text.

18. The system of claim 17, wherein the system includes a virtual private cloud established for a user and executing the patent automation tool, and
wherein the virtual private cloud is configured to establish a secure connection with a user-controlled device for back-end management of the patent automation tool and a user-controlled device for front-end usage of the patent automation tool.

19. The system of claim 17, wherein the system is included in a user network and the user network includes a server for executing the patent automation tool, a user-controlled device for back-end management of the patent automation tool, and a user-controlled device for front-end usage of the patent automation tool.

20. The system of claim 17, wherein the system includes a virtual private cloud established for a user and executing the patent automation tool, and
wherein the virtual private cloud is configured to establish a virtual private network connection with a user network that includes a user-controlled device for back-end management of the patent automation tool and a user-controlled device for front-end usage of the patent automation tool.

* * * * *